(No Model.)
T. GEORGE.
FASTENER FOR SHOE LACES, &c.
No. 583,646. Patented June 1, 1897.
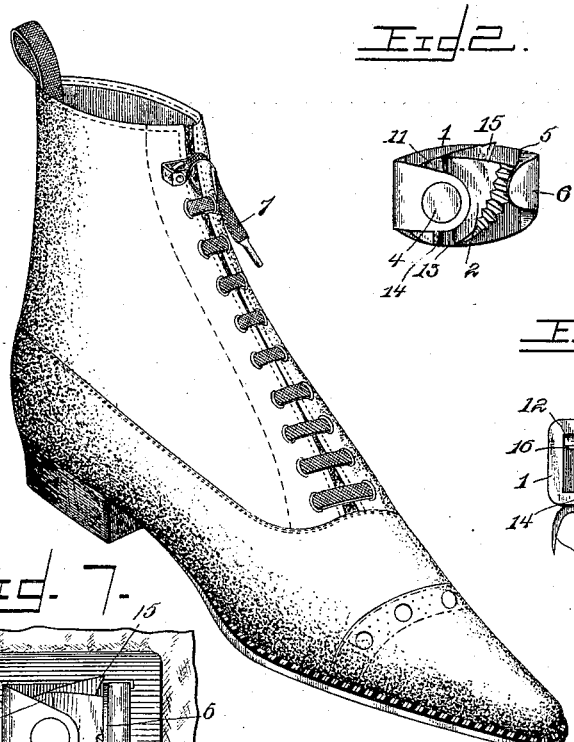
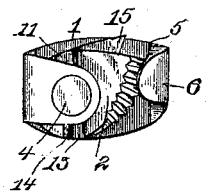
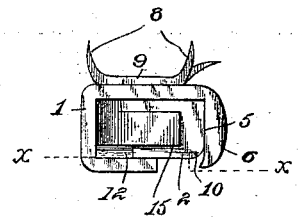
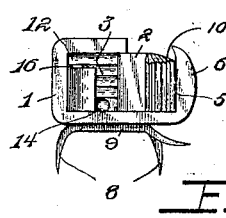
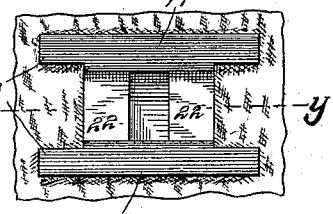
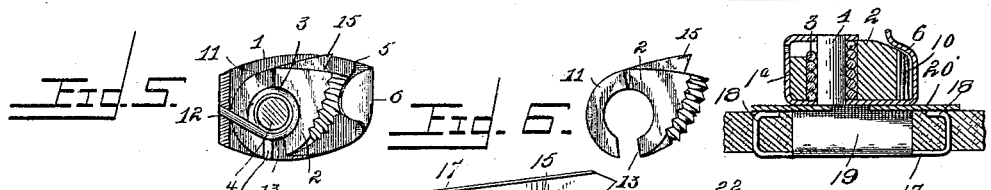
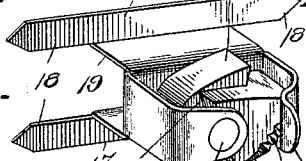
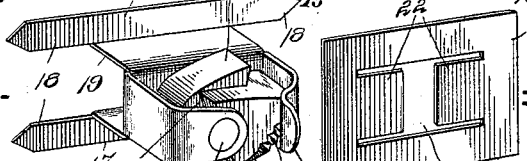
Witnesses
Inventor
Tuffield George.
By his Attorneys,
C. A. Snow & Co.

UNITED STATES PATENT OFFICE.

TUFFIELD GEORGE, OF DULUTH, MINNESOTA, ASSIGNOR OF ONE-HALF TO FRED KOORS, OF SAME PLACE.

FASTENER FOR SHOE-LACES, &c.

SPECIFICATION forming part of Letters Patent No. 583,646, dated June 1, 1897.

Application filed June 29, 1896. Serial No. 597,441. (No model.)

*To all whom it may concern:*

Be it known that I, TUFFIELD GEORGE, a citizen of the United States, residing at Duluth, in the county of St. Louis and State of Minnesota, have invented a new and useful Fastener for Shoe-Laces, &c., of which the following is a specification.

The principal object of this invention is the provision of an automatic fastener or lock for the laces of shoes, gloves, and corsets and which can be used for ropes for holding slack on tugs for tow-lines or for clutching ropes on vessels and for taking up and holding slack of wires on telephone and telegraph lines and wire fencing, but is designed chiefly for shoes, corsets, and gloves.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 shows the invention applied to a shoe for securing the end of the lace. Fig. 2 is a front view of the improved fastener or lock. Fig. 3 is a top plan view thereof. Fig. 4 is a bottom plan view of the same. Fig. 5 is a section on the line XX of Fig. 3. Fig. 6 is a detail view of the clamping-dog. Fig. 7 is a side elevation of a different form of fastener or lock. Fig. 8 is a rear view of the form shown in Fig. 7. Fig. 9 is a section on the line Y Y of Fig. 8. Fig. 10 is a perspective view of the form of fastener illustrated in Fig. 7. Fig. 11 is a detail view of the reinforcing-plate.

Corresponding and like parts are referred to in the following description and indicated in all the views of the drawings by the same reference-characters.

The fastener or lock comprises, essentially, three parts, a frame 1, a clamping-dog 2, and a spring 3, the clamping-dog having pivotal connection with the frame by means of a pin 4 and the spring 3 serving to cause the dog to automatically grip the lace, rope, cord, or wire to be held thereby, according to the application and use of the device.

The frame 1 is substantially rectangular in form and has a slot or opening 5 in a side adjacent to an end to admit of the ingress and egress of the lace or equivalent part to be gripped. The end 6 of the frame adjacent to the slot 5 is reduced and made tapering at its extremity, and its terminal portion curves or is deflected toward the slot or opening 5, so as to retain the lace 7 or its equivalent part in place when gripped between the clamping-dog 2 and the end 6. The part 6 is rounded at its edges or corners to admit of the lace sliding thereover without being cut or frayed, as would be the case if the corners were left intact. When the fastener is to be applied to a shoe, glove, or corset, it is provided on one side with retaining-points 8, which are passed through the material to which the fastener is to be secured and are clenched on the side of the said material opposite to that through which they are thrust, as will be readily understood. These retaining-points 8 may be provided in any convenient way, and, as shown, they are the terminal portions of a plate 9, secured by soldering or brazing to the frame 1.

The clamping-dog 2 is of a size to fit snugly within the frame 1, and its butt-end is curved and its front end beveled and adapted to cooperate with the end 6 of the frame to grip or clamp the lace passed between them. In order to prevent slipping of the lace, the front or beveled end of the dog is corrugated or roughened, and to facilitate the insertion of the lace between the dog and the end 6 the outer front corner of the dog is beveled, as shown at 10, thereby providing a space between the bent terminal portion of the part 6 and the opposing end portion of the dog 2, into which the lace is crowded when applying it to the fastener. The dog is hollow and its inner side is open, and the rear portion of its outer side is cut away, as shown at 11, to afford clearance for the rear arm 12 of the spring 3. A transverse slot 13 is formed in the lower side of the dog for the passage therethrough of the terminal 14 of the spring 3, said terminal engaging with the rear wall of the slot 13 and tending to cause the front end of the dog 2 to move toward the end 6 of the frame, thereby automatically gripping the lace or equivalent part placed between the parts 2 and 6. A projection 15 is formed on the top side of the dog for the finger to obtain a purchase against when it is required to move the dog backward to free the part clamped thereby. The butt-end of the dog obtains a bearing against the rear end of the frame and is formed on the arc of a circle struck from the axis about which the dog rocks, thereby enabling the rear end of the dog to remain in engagement with the rear end of the frame at all stages of its movement. From this construction it will be seen that the strain is sustained by the opposite ends of the frame 1 and is relieved from the pin 4, the latter serving simply to fix the position of the parts and retain the clamping-dog in operative relation.

The spring 3 is of the coil type and is mounted upon the pin 4, and its rear arm 12 operates in the space provided by cutting away the rear portion of the front side of the clamping-dog, as shown at 11, and extends through an opening 16 in the rear end of the frame. The other terminal 14 of the spring engages with the clamping-dog in the manner set forth and serves to throw the dog forward in the manner herein explained, so as to grip the lace 7 in the manner set forth.

The frame 1ª (illustrated in Fig. 7 and the detail views thereof) is substantially the same in construction as the frame 1, herein described at length, and is formed of sheet metal, which is stamped or struck up, but the means for attaching it to the shoe or part to which the fastener is applied are different from the means shown in the other views, and consist of parallel bars 17, having their end portions 18 bent about at right angles to be forced through the shoe or part to which the fastener is fitted and clenched, and connecting portions 19, which extend at right angles to the plane of the bars 17 and the base of the frame 1ª and which are of a length corresponding to the length of the frame. It will thus be seen that the frame 1ª and the bars 17 lie in different planes, the frame projecting from one side of the part to which the fastener is secured and the bars 17 lying against the opposite side of the said part to that from which the frame projects. A reinforcing-plate 20 has an opening 21 and oppositely-extending tongues 22, which project into the opening 21. This reinforcing-plate is placed upon that side of the part to which the fastener is secured opposite to the side against which the bars 17 bear, the said part being held between the plate 20 and the bars 17. The tongues 22 enter the space formed between the connecting portions 19 and project beneath the base of the frame 1ª. The reinforcing-plate 20 on one side and the parallel bars 17 on the opposite side of the shoe or equivalent part prevent the fastener from tilting, afford an extended bearing thereto, and provide means for rigidly and firmly attaching the device to the shoe. In applying this form of fastener to the shoe it is necessary to provide an opening for the frame to pass through, the latter being held in place by forcing the bent ends 18 through the shoe and clenching the same. The reinforcing-plate 20 is placed in position with its tongues 22 projecting beneath the base of the frame and into the space formed between the connecting parts 19. The clamping-dog 2 and spring 3 are substantially the same as herein referred to and operate as previously described.

Having thus described the invention, what is claimed as new is—

1. In a fastener of the character described, the combination of a frame having a slot in a side adjacent to one end, a pin at one side of the slot and connecting the side portions of the frame, a coil-spring mounted upon the pin and having its end portions projecting outwardly, and having one end in engagement with the frame, and a clamping-dog mounted upon the pin and coil-spring and having a finger projection and a transverse slot in a side communicating with the opening through which the coil-spring passes to receive the other terminal thereof, and having the rear portion of a side cut away to afford clearance for the terminal of the spring which is in engagement with the frame when the dog is manipulated, substantially as specified.

2. In a fastener of the character described, the combination of a frame having a slot in a side adjacent to its front end, and having the terminal portion of the front end tapering and bent toward the said slot, and having the edges or corners rounded, and a clamping-dog pivotally supported within the frame and having its front end beveled and its outer front corner cut away to form a space with the bent terminal portion of the front end of the frame to provide for the ready ingress of a lace or equivalent part between the clamping-dog and the front end of the frame, substantially as set forth.

3. The herein-described fastener for the purposes set forth, comprising a frame having a slot in one side adjacent to an end, and having retaining-points at its opposite side, and having the end adjacent to the slot tapering and bent toward the slot, a hollow clamping-dog pivotally supported within the frame and having its front end beveled and its outer corner cut away, and having its rear end rounded and bearing against the rear end of the frame, a pin connecting the sides of the frame and fixing the position of the clamping-dog, and a coil-spring mounted upon the pin and located within the dog, and having its end portions engaging positively with the frame and the dog to cause the latter to automatically grip the lace or equivalent part to be held, substantially as set forth.

4. In a fastener of the character described, a frame provided with means for securing the end of a lace or cord, and provided with parallel bars located in a different plane from the base of the frame and having their terminal portions bent, and connecting portions between the frame and parallel bars, substantially as set forth.

5. In a fastener of the character described, the combination with a frame provided with securing means and having parallel bars and intermediate connecting portions, of a reinforcing-plate having an opening to receive the frame and provided with oppositely-extending tongues to pass beneath the base of the frame and enter the space formed between the aforesaid connecting portions between the frame and parallel bars, substantially as set forth.

In testimony that I claim the foregoing as my own I have hereto affixed my signature in the presence of two witnesses.

TUFFIELD GEORGE.

Witnesses:
  WALLACE WARNER,
  FRED KOORS.